United States Patent [19]

Marsh

[11] Patent Number: 5,263,374
[45] Date of Patent: Nov. 23, 1993

[54] FLOWMETER WITH CONCENTRICALLY ARRANGED ELECTROMAGNETIC FIELD

[75] Inventor: Lawrence B. Marsh, Buckeystown, Md.

[73] Assignee: Marsh-McBirney, Inc., Frederick, Md.

[21] Appl. No.: 825,504

[22] Filed: Jan. 24, 1992

[51] Int. Cl.$^5$ .............................................. G01F 1/00
[52] U.S. Cl. .................... 73/861.15; 73/861.11
[58] Field of Search ........................ 73/861.11–861.17

[56] References Cited

U.S. PATENT DOCUMENTS

| | | |
|---|---|---|
| 2,149,847 | 3/1939 | Kolin . |
| 2,583,724 | 1/1952 | Broding . |
| 2,685,796 | 8/1954 | Romanowiski et al. . |
| 2,691,303 | 10/1954 | DeBoisblanc . |
| 2,733,604 | 2/1956 | Coulter . |
| 2,782,369 | 2/1957 | Werner et al. . |
| 2,896,451 | 7/1959 | Rinia . |
| 3,002,379 | 10/1961 | Hurley . |
| 3,005,342 | 10/1961 | Head . |
| 3,040,571 | 6/1962 | Kolin . |
| 3,138,022 | 6/1964 | Mayer . |
| 3,183,379 | 5/1965 | Hurwitz, Jr. . |
| 3,191,436 | 6/1965 | Davis . |
| 3,260,868 | 7/1966 | Brenner . |
| 3,286,522 | 11/1966 | Cushing . |
| 3,309,924 | 3/1967 | Kolin et al. . |
| 3,323,364 | 6/1967 | Hunter . |

FOREIGN PATENT DOCUMENTS

| | | |
|---|---|---|
| 186429 | 2/1986 | European Pat. Off. . |
| 1291523 | 12/1964 | Fed. Rep. of Germany . |
| 2525387 | 12/1976 | Fed. Rep. of Germany . |
| 2718963 | 11/1977 | Fed. Rep. of Germany . |
| 3018260 | 11/1981 | Fed. Rep. of Germany . |
| 3712948 | 11/1988 | Fed. Rep. of Germany . |
| 51970 | 4/1977 | Japan . |
| 75356 | 6/1977 | Japan . |
| 54314 | 5/1981 | Japan . |
| 200821 | 12/1982 | Japan . |
| 200822 | 12/1982 | Japan . |
| 160815 | 9/1983 | Japan . |
| 159720 | 7/1988 | Japan . |
| 292214 | 11/1989 | Japan . |
| 905864 | 2/1982 | U.S.S.R. . |
| 987392 | 1/1983 | U.S.S.R. . |
| 1150544 | 4/1985 | U.S.S.R. . |
| 1260840 | 1/1972 | United Kingdom . |
| 2153085 | 8/1985 | United Kingdom . |

OTHER PUBLICATIONS

Shercliff, "Experiments on the Dependence of Sensitivity on Velocity Profile in Electromagnetic Flowmeters", Journal of Scientific Instruments, vol. 32, Nov. 1955, p. 441.

Shercliff, "Relation Between the Velocity Profile and (List continued on next page.)

Primary Examiner—Richard E. Chilcot, Jr.
Assistant Examiner—R. Biegel
Attorney, Agent, or Firm—Laubscher & Laubscher

[57] ABSTRACT

An electromechanical flowmeter includes a coil arrangement located completely outside the fluid conduit for producing a magnetic field that extends concentrically about the longitudinal axis of the conduit, the portion of the field adjacent the inner periphery of the conduit being stronger than that adjacent the center of the conduit. First electrodes are mounted on the interior wall surface of the conduit within the magnetic field, and second electrodes are arranged at a location generally unaffected by the field. In the preferred embodiment, the second electrode is mounted on the interior wall surface outside the magnetic field in longitudinally-spaced relation relative to the first electrodes, whereby the provision of any flow-obstructing electrode within the conduit is completely avoided. In a non-preferred embodiment, the second electrode is mounted centrally with the conduit relative to the longitudinal axis thereof. The field is produced by a pair of magnetic field generators—such as toroidal windings or squirrel cage windings—arranged with their magnetic axes extending circumferentially in the same direction relative to the conduit.

17 Claims, 4 Drawing Sheets

U.S. PATENT DOCUMENTS

| | | |
|---|---|---|
| 3,358,075 | 12/1967 | Hunt . |
| 3,372,589 | 3/1968 | Mannherz . |
| 3,373,608 | 3/1968 | Ketelsen . |
| 3,397,575 | 8/1968 | Ham . |
| 3,406,569 | 10/1968 | Rohmann . |
| 3,412,608 | 11/1968 | Haacke . |
| 3,425,274 | 2/1969 | Clement et al. . |
| 3,433,066 | 3/1969 | Bailey . |
| 3,479,871 | 11/1969 | Cushing . |
| 3,527,095 | 9/1970 | Wada . |
| 3,566,684 | 3/1971 | King . |
| 3,566,686 | 3/1971 | Cushing . |
| 3,570,309 | 3/1971 | Birnstingl . |
| 3,580,071 | 5/1971 | Hickman . |
| 3,589,186 | 6/1971 | Bourg et al. . |
| 3,681,986 | 8/1972 | Wyatt ............................... 73/861.12 |
| 3,805,768 | 4/1974 | Barefoot et al. ................. 73/861.12 |
| 3,911,742 | 10/1975 | Kolin . |
| 3,942,377 | 3/1976 | Ginsburg et al. . |
| 3,991,612 | 11/1976 | Mankerz et al. . |
| 4,036,052 | 7/1977 | Seale . |
| 4,083,246 | 4/1978 | Marsh ................................. 73/227 |
| 4,137,766 | 2/1979 | Handel . |
| 4,195,515 | 4/1980 | Small . |
| 4,308,752 | 1/1982 | Appel et al. . |
| 4,434,666 | 3/1984 | Hemp et al. . |
| 4,459,857 | 7/1984 | Murray et al. . |
| 4,503,711 | 3/1985 | Bohn . |
| 4,520,650 | 6/1985 | Palmer et al. . |
| 4,524,627 | 6/1985 | Yamasaki et al. . |
| 4,614,121 | 9/1986 | Hansen et al. . |
| 4,716,769 | 1/1988 | Yamada . |
| 4,726,236 | 2/1988 | Wada . |
| 4,736,635 | 4/1988 | Murase . |
| 4,809,559 | 3/1989 | Kasai . |
| 4,848,146 | 6/1989 | Bruno et al. . | the Sensitivity of Electromagnetic Flowmeters", Letters to the Editor, Jan. 11, 1954, pp. 817-818.

Kolin, "Principle of Electromagnetic Flowmeters Without External Magnet", Letters to the Editor, Mar. 21, 1956, pp. 965-966.

Eastman et al, "A Magnetic Flowmeter with Concentric Electrodes", Instrumantation Technology, Jun. 1970, pp. 52-55.

Bevin, "Flowmeters and the Effect of Velocity Profile", Quart. Journal Mech. and Applied Math, vol. XXIV, Mar. 1971, pp. 347-372.

Hemp, "Improved Magnetic Field for an Electromagnetic Flowmeter with Point Electrodes", J. Physics D, Appl. Phys., vol. 8, 1975, p. 983.

Tsirbunov et al., "Surgeproof Induction Flowmeter with an Axisymetric Magnetic Field for Pipelines with a large Flow-through Cross Section", Magnitnaya Gidrondinamika, No. 4, pp. 146-148, Oct.-Dec. 1972.

Haacke, "Sensitivity of the Electromagnetic Flowmeter to Fluid Velocity Profile", Flow, pp. 735-743, 1974.

Baker, "A Review of Some Application of Electromagnetic Flow Measurement", Review of Applications, pp. 745-753.

Shercliff, "The Flow of Conducting Fluids in Circular Pipes Under Transverse Magnetic Fields", Department of Engineering, University of Cambridge, Sep. 19, 1956 pp. 644-666.

Shercliffe, "The Theory of Electromagnetic Flow-Measurement", University Micro-films International, 1962, pp. 18-19, 23, 115-119.

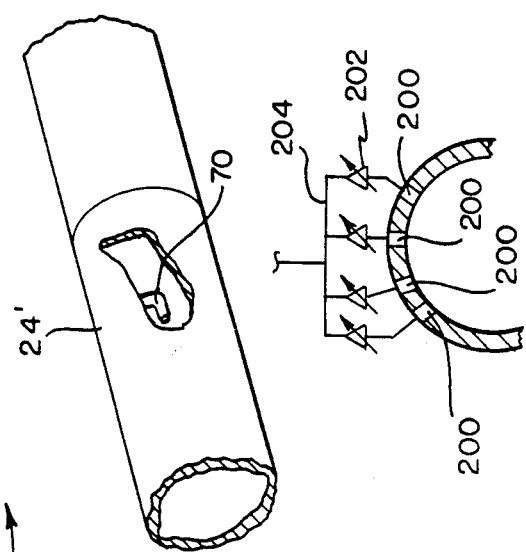
FIG. 10
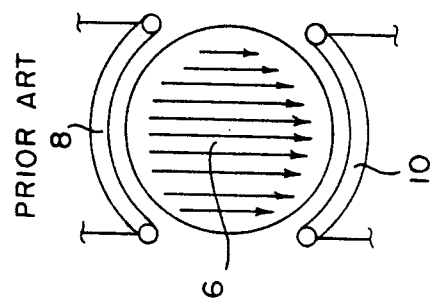
FIG. 26
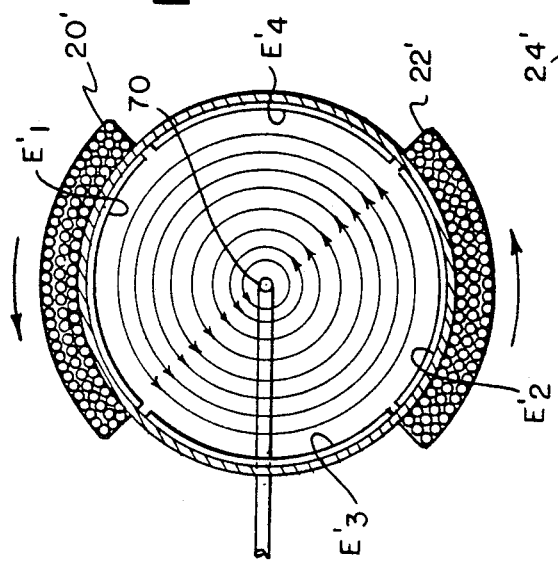
FIG. 9
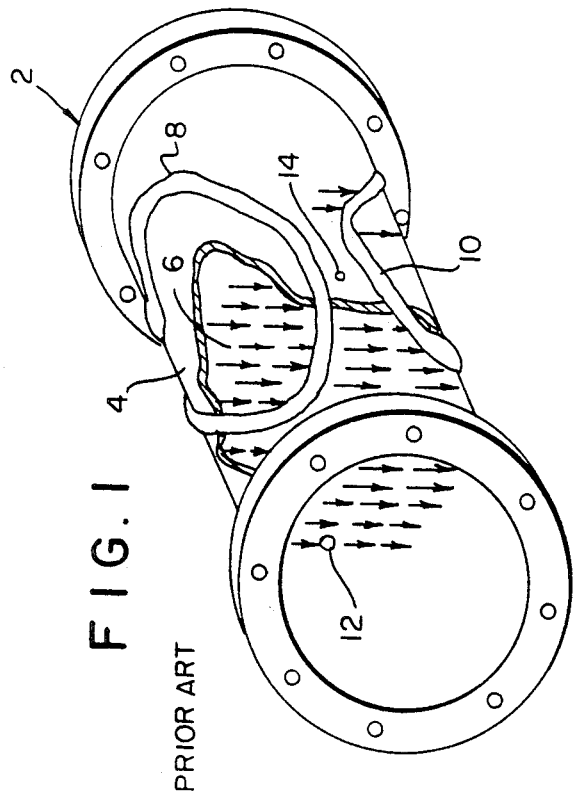
FIG. 1 PRIOR ART
FIG. 3 PRIOR ART
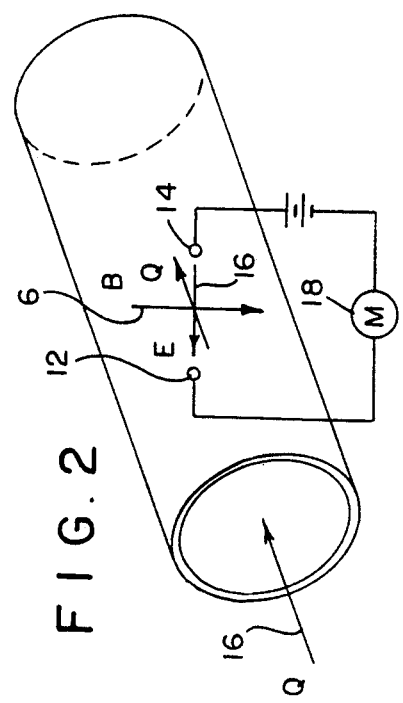
FIG. 2 PRIOR ART

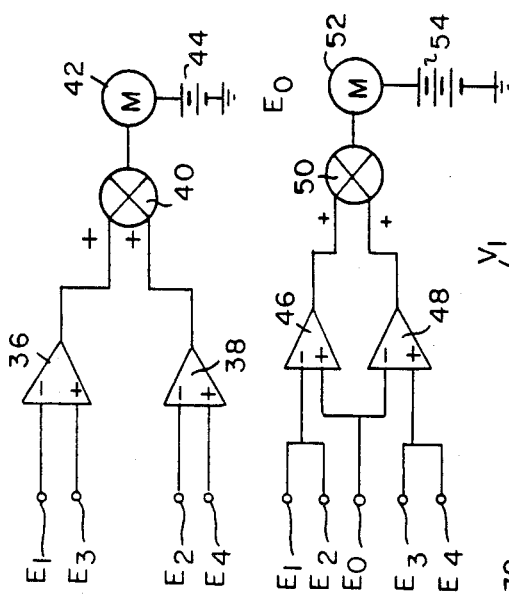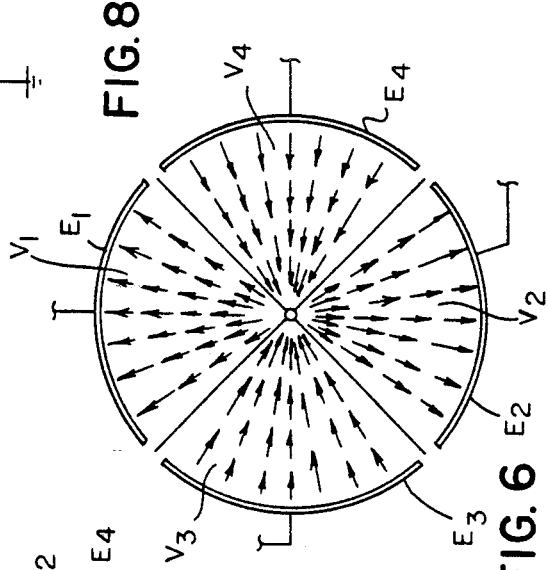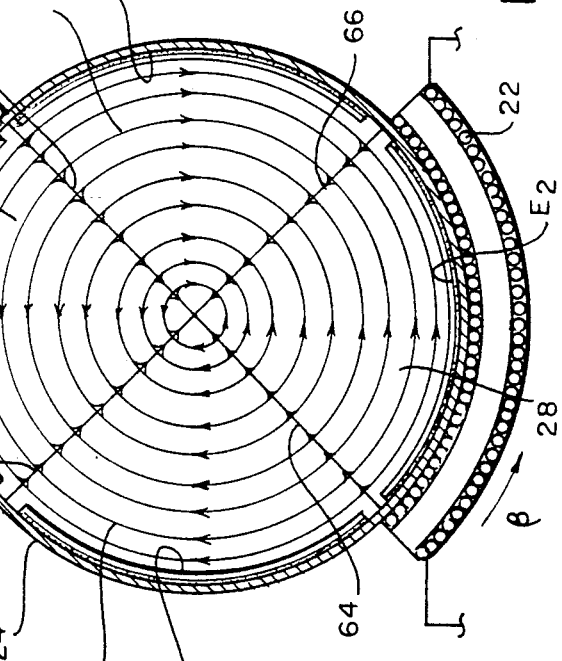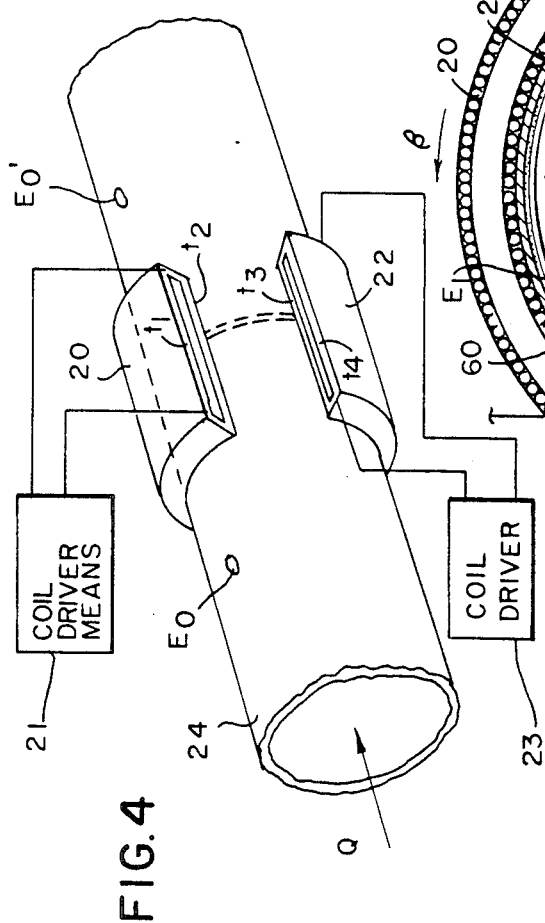

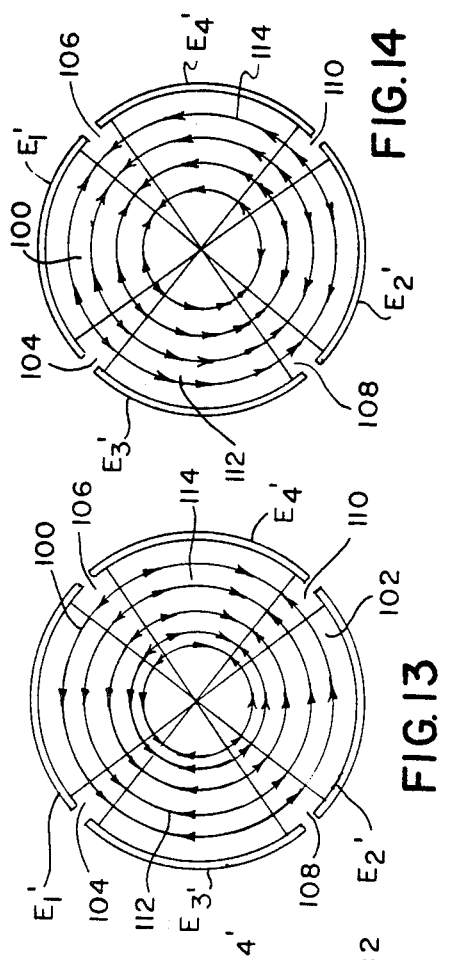
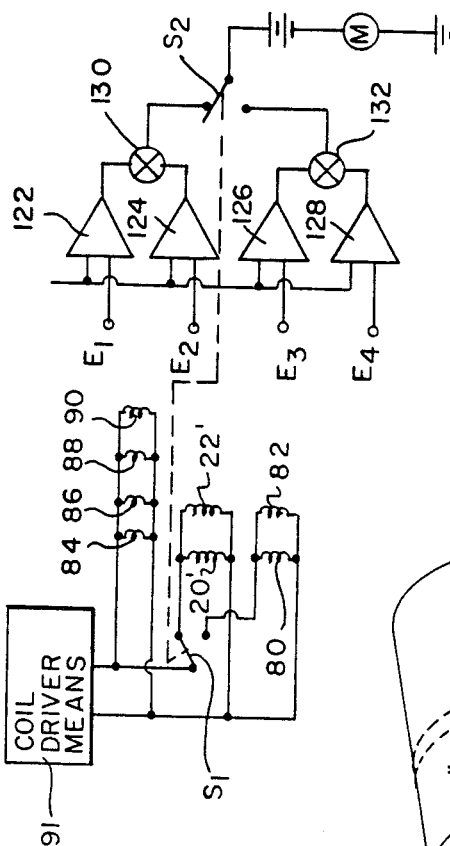
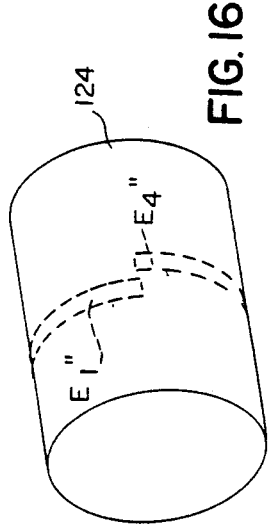
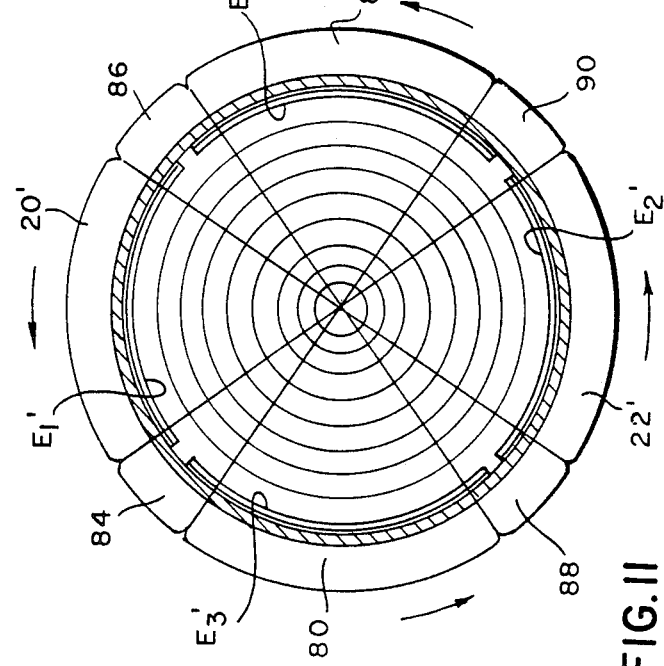
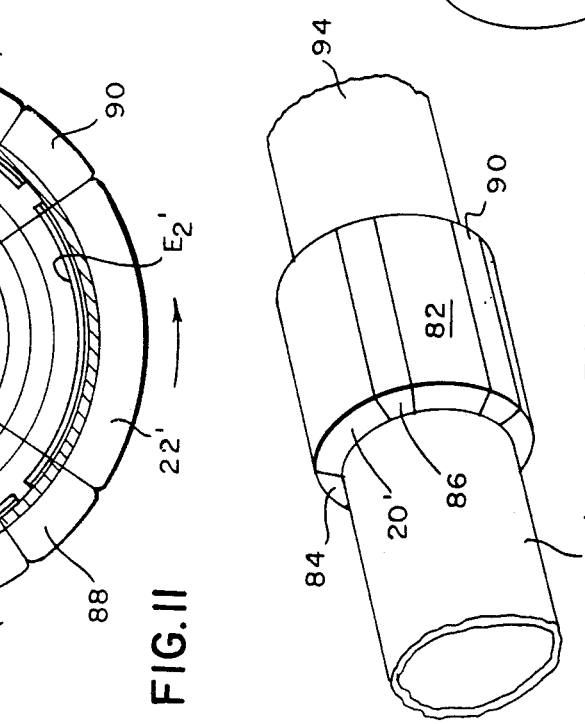

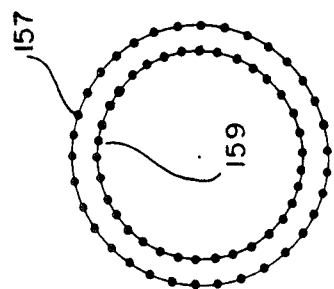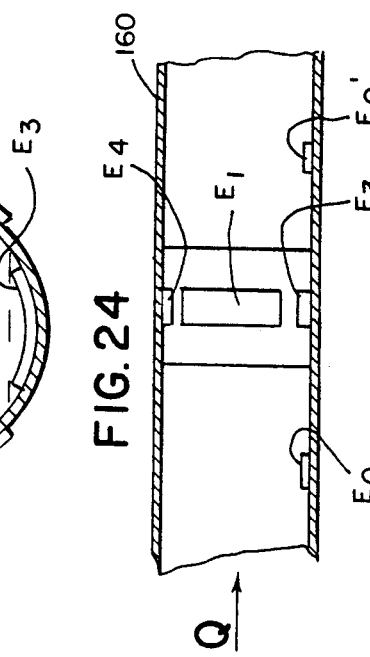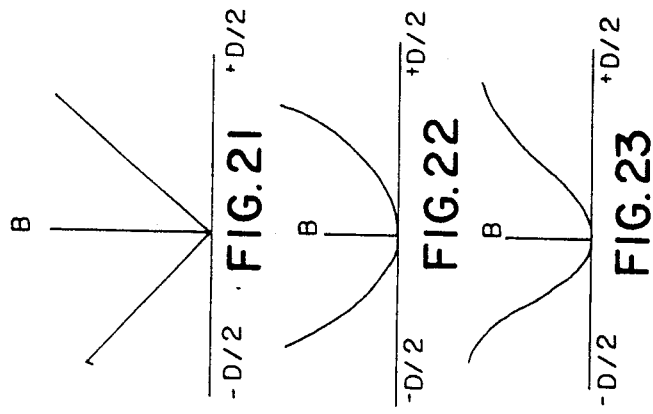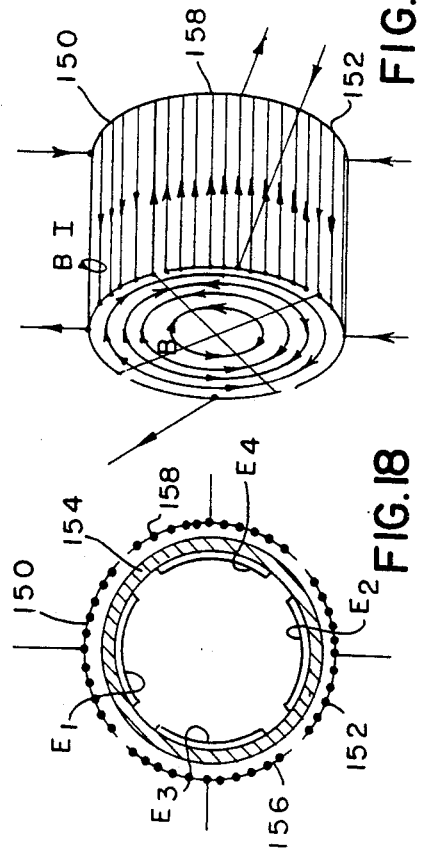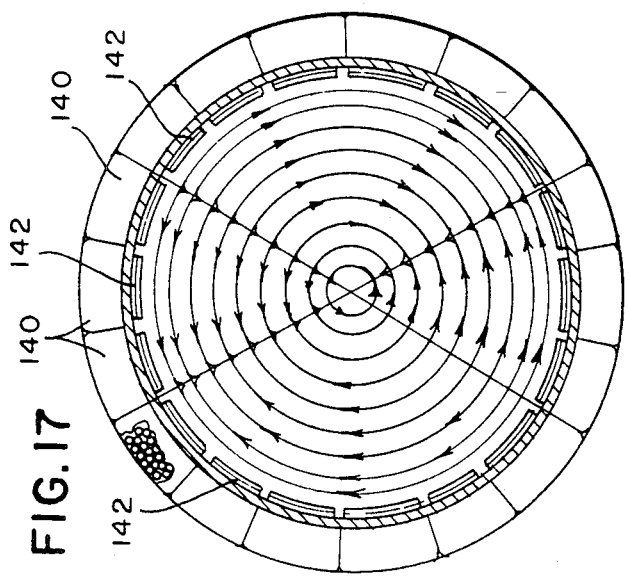

FLOWMETER WITH CONCENTRICALLY ARRANGED ELECTROMAGNETIC FIELD

FIELD OF THE INVENTION

An electromagnetic flowmeter for measuring the velocity of fluid flow in a conduit is disclosed, wherein electromagnetic means completely external of the conduit generate a magnetic field that extends concentrically about the longitudinal axis of the conduit, which field is stronger adjacent the inner periphery of the conduit wall, and weaker adjacent the center of the conduit. The potential between first electrodes arranged in circumferentially spaced relation on the inner periphery of the conduit within the magnetic field, and longitudinally spaced second electrode means outside the magnetic field, affords an accurate measurement of flow velocity.

BRIEF DESCRIPTION OF THE PRIOR ART

Electromagnetic flowmeters are well known in the patented prior art, as evidenced, for example, by the prior patents to Broding U.S. Pat. No. 2,583,724, De Boisblanc U.S. Pat. No. 2,691,303, and Handel U.S. Pat. No. 4,137,766.

Coaxial type flowmeters are discussed in the book *The Theory of Electromagnetic Flow Measurement* (1962) by J.A. Shercliff. Shercliff indicates that the coaxial electromagnetic flowmeter is the one meter that would be totally insensitive to velocity profiles. Shercliff discusses two ways of implementing such a meter: (1) through the use of a central member generating a current and thus creating a magnetic field that is strongest near the center of the pipe and weakest near the pipe periphery (i.e., just the opposite of what is required), and (2) by the passing of current down through the fluid itself (the fluid would have to be a conductive metal), thereby causing a magnetic field that is zero at the center and stronger near the outer wall (the proper magnetic shape for having a meter that is insensitive to velocity profile shifts).

The patents to Kasai U.S. Pat. No. 4,809,559 and U.S. Pat. Bourg No. 3,589,186 represent attempts to minimize the changing profile effects of transverse field type flowmeters by using wide angle electrodes and/or shaped magnetic fields.

While virtually all flowmeters of modern day industrial applications are of the transverse field type, there has been a small amount of work in the areas of both axial field electromagnetic flowmeters and radial field electromagnetic flowmeters. Examples of radial field electromagnetic flowmeters are shown in the aforementioned U.S. Pat. Nos. 2,691,303 and 2,583,724, and in "*A Magnetic Flowmeter with Concentric Electrodes*" by Eastman et al, Instrumentation Technology, Jun. 1970, pages 52-54, an axial field flowmeter is described.

In "*Principle of Electromagnetic Flowmeter Without External Magnet*, Letters to the Editor, 1956, by Alexander Kolin, there is discussed a meter where the field is produced by passing a current through a moving liquid metal, wherein the detection electrodes consist of a circumferential ring (or the pipe wall itself) and a central electrode. The magnetic field is established by a current flowing in the moving liquid metal. Kolin suggests that as an alternate to a central electrode, an electrode could be placed in an area outside the magnetic field. No details of such a construction are presented.

A major drawback exists in each of these flowmeters. The traverse field type flowmeter does not properly weight each moving water particle and hence, such flowmeters are subject to variations in accuracy with changes in flow profiles. The coaxial meters described by Shercliff and by Kolin are constructed for use only with liquid metals or, with a center member that creates both the axial concentric field and serves as a center electrode, such field being stronger at the pipe center and weaker at the pipe periphery, the opposite of which is desired.

SUMMARY OF THE INVENTION

Accordingly, a primary object of the invention is to provide a flowmeter including field generating means external of a conduit for generating a magnetic field within the conduit that extends concentrically about the longitudinal axis of the conduit, the field being stronger adjacent the inner periphery of the conduit than at its center. Signal detecting means are provided for measuring the potential between first electrode means arranged within the magnetic field, and second reference electrode means spaced longitudinally of the conduit from the first electrode means and arranged outside any significant effects of the magnetic field. According to a characterizing feature of the preferred embodiment of the invention, the first and second electrode means are each mounted adjacent the inner periphery of the conduit, thereby avoiding the use of flow-obstructing central electrodes in the conduit. According to a non-preferred embodiment, however, the reference electrode may be mounted centrally within the conduit intermediate the diametrically arranged field generating means.

According to a more specific object of the invention, the magnetic field producing means includes a pair of circumferentially spaced field generators arranged in diametrically opposed relation on the outer surface of the conduit, the axes of the field generators extending circumferentially in the same direction relative to the conduit. The magnetic field generators may be either a pair of toroidal coils, or a pair of squirrel-cage-type windings. The first electrode arrangement includes a first pair of electrodes arranged radially between the field generators and the center of the conduit, respectively, and a second pair of electrodes arranged circumferentially in the spaces between the field generators, respectively. Summing means add the signals produced at the electrodes, and flow display means connected between the first and second electrodes afford an accurate measurement of flow velocity.

According to a further object of the invention, a second pair of magnetic field generating means is arranged in circumferentially spaced relation between the field generating means of the first pair, respectively, the pairs of field generating means being alternately energized, respectively, thereby to produce in said conduit a generally annular field that extends concentrically about the longitudinal axis of the conduit.

According to another embodiment of the invention, in addition to the first pair of magnetic field generators—which produce opposed radially extending pie-shaped sectors of magnetic fields in the conduit extending concentrically in the same direction relative to the longitudinal axis of the conduit—transition field generating means are provided on the external periphery of the conduit adjacent the sides of the pie-shaped magnetic field sectors, thereby to shape the transition zones between the opposed magnetic fields, respectively.

According to another object of the invention, in order to measure the velocity of fluid flow of partially filled conduits or open channels, the first magnetic field generating means are arranged in horizontal diametrically opposite relation relative to the conduit.

BRIEF DESCRIPTION OF THE DRAWINGS

Other objects and advantages of the invention will become apparent from a study of the following specification when viewed in the light of the accompanying drawing, in which:

FIGS. 1–3 illustrate diagrammatically a prior art electromagnetic flowmeter of the transverse field type;

FIG. 4 is a perspective view of a first embodiment of the present invention including toroidal windings for producing the magnetic field;

FIGS. 5 and 6 are diagrammatic sectional illustrations for explaining the operation of the flowmeter of FIG. 4;

FIG. 7 is a detailed circuit diagram illustrating the means for summing the signals appearing at the electrodes arranged within the magnetic field, and FIG. 8 illustrates a modification of the circuit of FIG. 7;

FIGS. 9 and 10 are sectional and perspective views, respectively, illustrating a non-preferred embodiment of the invention including a centrally mounted reference electrode;

FIGS. 11 and 12 illustrate a modification of the flowmeter of FIG. 4, and FIGS. 13 and 14 illustrate the operation of the apparatus of FIG. 11;

FIG. 15 is a circuit diagram illustrating the sequential switching means for operating the flowmeter of FIG. 11;

FIG. 16 is a perspective view of a modification of the embodiment of FIG. 11;

FIG. 17 is a sectional view diagrammatically illustrating another embodiment of the invention;

FIGS. 18 and 19 illustrate another embodiment of the invention including squirrel-cage-type windings for generating the magnetic field within the conduit;

FIG. 20 is a diagrammatic view illustrating the manner of providing field shaping windings in the apparatus of FIGS. 18 and 19;

FIGS. 21–23 illustrate the shaping of the field by field shaping means;

FIGS. 24 and 25 are transverse and longitudinal sectional views, respectively, illustrating a partially filled conduit or open-channel type of flow measuring device in accordance with the present invention; and FIG. 26 is a schematic illustration of an arcuate electrode formed from a plurality of electrically connected point electrodes.

DETAILED DESCRIPTION

Referring first more particularly to FIGS. 1–3, it is known in the prior art to provide an electromagnetic flowmeter 2 having a conduit 4 through which flows a conductive fluid—such as water, waste water, or the like—the velocity of which is to be measured. In order to establish a magnetic field 6 extending transversely across the conduit 4, there are provided a pair of coaxially arranged coils 8 and 10 in vertically spaced diametrically opposed relation adjacent the outer surface of the conduit. Arranged in diametrically opposed relation across the horizontal diameter of the conduit are a pair of output electrodes 12 and 14 that extend through corresponding openings contained in the container for contact at their adjacent ends with the fluid flowing through the conduit. As shown in FIG. 2, with the flux path 6 extending vertically and the conductive fluid flow 16 extending horizontally, following Fleming's left-hand rule, the electromotive force 16 extends horizontally orthogonally between the electrodes 12 and 14, which force is measured by the meter 18 as a function of velocity.

Referring now to FIGS. 4–6, according to the present invention, a pair of toroidal windings 20–22 are arranged externally of the conduit 24 at diametrically opposed positions, the turns of the windings being rectangular and arranged with their opposed long sides $t_1$, $t_2$ and $t_3$, extending longitudinally of the conduit, respectively, whereby the magnet axes $\beta$ (FIG. 5) of the toroidal windings extend circumferentially in the same direction relative to the conduit. As shown in FIG. 4, the toroidal windings 20 and 22 are energized by coil drivers 21 and 23 of the alternating field type such as square wave or pulsed DC field drive, respectively, to generate lines of magnetic flux 26 and 28 (FIG. 5) that extend generally concentrically about the longitudinal axes of the conduit, the magnetic fields being generally pie-shaped, and being stronger adjacent the inner periphery of the conduit and weaker at the center of the conduit (owing to the proximity of the windings to the inner periphery of the conduit). Thus, a distribution of the flux is provided across the conduit cross-section that is substantially zero at the center of the conduit and increases with distance along the radius, as shown in FIG. 21. Four circumferentially spaced electrodes $E_1$, $E_2$, $E_3$, and $E_4$ define first electrode means associated with the magnetic field, the electrodes $E_1$ and $E_2$ being arranged radially intermediate the coils 20 and 22 and the center of the conduit, respectively, and the electrodes $E_3$ and $E_4$ being associated with the spaces between the toroidal windings. In accordance with acknowledged electrical laws, the pie-shaped magnetic fields of flux 26 and 28 are opposed by corresponding pie-shaped fields 30 and 32 that extend in the opposite direction directly about the longitudinal center axes of the conduit 24. These magnetic fields, when interacting with a conductive fluid flowing through the conduit, produce voltage vectors that extend radially outwardly and inwardly, respectively, as shown in FIG. 6. As shown in FIG. 7, the signals appearing at the electrodes $E_1$ and $E_3$ are supplied to the negative and positive inputs of the operational amplifier 36, respectively, and the inputs of the electrodes $E_2$ and $E_4$ are supplied to the negative and positive inputs to the operational amplifier 38, the outputs of operational amplifiers being supplied to the summing device 40. Thus, the meter 42, is connected in series between the output of the summing device 40 and a reference electrode $E_0$ that is positioned adjacent the inner periphery of the wall of conduit 24 in longitudinally spaced relation to the electrodes $E_1$–$E_4$, the reference electrode $E_0$ being outside any significant influence of the magnetic field produced by the toroidal windings 20 and 22. Thus, the reading on the meter 42 affords an indication of the velocity of the fluid flowing through the conduit 24. As shown in FIG. 8, the input from the four electrodes $E_1$–$E_4$ within the magnetic field and the reference electrode $E_0$ outside the magnetic field may be combined as inputs to the differential amplifiers 46 and 48, respectively, which serve as inputs to the summing means 50.

According to a characterizing feature of the invention, the preferred configuration replaces the flow-obstructing electrodes at the center portion of the conduit such non-flow obstructing electrodes being adjacent the inner periphery of the conduit 24. The electrode E0—which shows as a reference or "phantom" electrode—may be either upstream of the magnetic field producing means or, as shown by the reference character $E_0'$ downstream of the magnetic field producing means. Also, it is possible to simultaneously connect both of the reference electrodes $E_0$ and $E_0'$ to the summing means for accurately indicating the velocity of fluid flow.

As shown in FIG. 5, transition regions 60, 62, 64 and 66 are defined between the sides of the pie-shaped magnetic regions 26, 28, 30 and 32, respectively, which transition regions are caused by the abrupt change in direction of the magnetic flux. The operational or buffered amplifiers 36 and 38, and 46 and 48, could also be gain modifiers to compensate for magnetic field variations. Since the voltage vectors $V_1$ and $V_2$ extend radially outwardly and the voltage vectors $V_3$ and $V_4$ extend radially inwardly, they are inputted to terminals of opposite polarity of the operational amplifiers 36 and 38, respectively.

As indicated above, the regions of the magnetic field adjacent the inner periphery of the conduit 24 (and thus adjacent the field-producing means 20 and 22) are stronger than the regions adjacent the center of the conduit, thereby providing greater flux where the cross-section of the conduit is larger, so that the proper flux distribution is achieved.

A second but less preferred configuration consists of a first detection electrode contained within the magnetic field and mounted adjacent the inner periphery of the conduit and a second central electrode mounted on the axis of the conduit. (In all drawings referencing the "phantom electrode", this phantom electrode can be replaced by the central electrode yielding essentially the same results but albeit, having a flow obstructing configuration. Such configurations are useful only in clean flowing fluids where debris would not accumulate.) Referring to FIGS. 9 and 10, the reference electrode 70 is mounted centrally within the conduit 24' diametrically between the field generating coils 20' and 22', respectively.

As indicated previously, the regions of transition 60, 62, 64 and 66 of FIG. 5 between the opposed magnetic field sectors are of interest. While the magnetic field changes direction between sectors, it does not switch direction instantly but, in a practical sense, there is a region where the magnetic field lines are generally not concentric and do not contribute to the output signal in the same manner as most other areas where there is a more predictable, concentric magnetic field. One method of compensating for this transition area would be to reduce the angular extent of the electrodes, thereby leaving a small sector of the pipe unmeasured. Alternatively, as proposed in the embodiment of FIGS. 11 and 12, the magnetic field producing means includes a second pair of toroidal windings 80 and 82 circumferentially spaced relative to the first windings 20' and 22', together with transition toroidal windings 84, 86, 88 and 90 arranged between the first and second pairs of windings, respectively. All of the toroidal windings are arranged with their magnetic axes extending circumferentially in the same direction relative to the fluid conduit 94. As shown in FIG. 15, the transition toroidal coils 84, 86, 88 and 90 are continuously energized in one direction, by driver means 91, while the first set of toroidal coils 20' and 22' are alternately energized relative to the second set of toroidal windings 80 and 82, owing to the operation of the ganged single-pole-dual position switches S1 and S2. Thus, when the coils 20' and 22' are energized, the flux patterns 100 and 102 extend concentrically in the same direction as the transitional flux paths 104, 106, 108 and 110 (FIG. 13). The flux paths 112 and 114 associated with the deenergized coils 80 and 82 extend concentrically in the opposite direction (i.e., the clockwise direction shown in FIG. 13). When the ganged switches S1 and S2 are switched to the other position, the flux patterns of the sections 112 and 114 (FIG. 14) extend in the same direction as the transition fields 104, 106, 108, and 110 (i.e., in the counterclockwise direction). The fields 100 and 102 associated with the now de-energized windings 20' and 22' extend in the opposite (i.e., the clockwise) direction. As shown in FIG. 11, the electrodes $E_1'$, $E_2'$, $E_3'$, and $E_4'$ extend at their adjacent edges within the associated transition zones. Successive electrodes could be lengthened and caused to overlap at their adjacent edges, as shown in FIG. 16, by displacing alternate pairs of electrodes $E_1''$, $E_2''$, and $E_3''$, $E_4''$ slightly longitudinally of the conduit 124, respectively.

The embodiment of FIGS. 11-16 affords the advantage that the voltage signals cover the full 360° of total flow area without being influenced by the transition regions. Of course, lesser portions of the flow pipe can be measured without having total coverage, but the accuracy of such a device would be reduced.

In the previously described configurations, the output signal is representative of the instantaneous total flow to the conduit without analyzing the signals to determine if asymmetry of flow existed, or if so, in what sector. If one should wish to determine which sector such asymmetry exists, then the configuration shown in FIG. 17 could be used. In this configuration, smaller arcuate sectors 140 are energized, and the electrodes 142 associated therewith are sampled sequentially until the full 360° has been energized and the signal sampled. These sampled signals may be stored in electronic circuitry for subsequent analysis. With such circuitry, not only can the instantaneous total flow rate be measured, but the contributions from each sector can be analyzed for engineering purposes.

As an alternative to the toroidal winding means previous disclosed for producing the concentrically arranged magnetic fields, it is also possible to use squirrel-cage-type windings, as shown in FIGS. 18 and 19. Thus, squirrel cage windings 150 and 152 are arranged in diametrically opposed relation relative to the conduit 154, and a second set of windings 156 and 158 are arranged in the spaces between the first pair of field generators. The two pairs of squirrel-cage-type windings are alternately energized as discussed above, whereby the concentric magnetic fields alternately produced within the conduit extend in the same direction, as shown in FIG. 19. Shaping windings may be provided as shown in FIG. 20, thereby to produce leveling of the response curves, as shown in FIGS. 21-23. In FIG. 20, the magnetic field generator is a plurality of squirrel cage type magnetic field generators 157, 159 which are spaced in such a manner and have the polarity and relative magnetic field strength generation, such that the field is linearized more than what would occur with just one coil.

As previously stated, the desired magnetic field shape is such that the magnetic field is near zero at the pipe center and is linearly increasing in magnitude to the inner periphery, as in FIG. 21. To achieve such a field, it is often necessary to use auxiliary windings such as those shown in FIG. 20 for the squirrel cage configuration. Since the field from the main winding creates a shape as in FIG. 22, the use of auxiliary bucking windings creates the shape of FIG. 23 which more approximates the desired shape. Additional shaping of the magnetic field such as varying the number of turns along the outer circumference is often desirable to compensate for the fact that the electrodes give somewhat greater weight to those flow signals produced near the electrode than those produced at a greater distance, a fact readily recognized by those in the art.

Referring now to FIGS. 24 and 25, the instrument may be designed for measuring the flow of fluid in a partially filled conduit 160, or in an open channel. In this embodiment the first pair of field-producing toroidal windings 162 and 164 are diametrically arranged opposite a horizontal diameter of the conduit 160, the windings being adjacent the external surface of the conduit. The four electrodes $E_1$-$E_4$ are arranged adjacent the inner surface of the conduit. The reference or phantom electrodes $E_0$ and/or $E_0'$ are provided either upstream and/or downstream of the magnetic field produced by the field generating means 162 and 164, whereby the provision of any center electrode within the conduit is avoided.

In the embodiment of FIG. 26, a plurality of discrete point electrodes 200 are arranged in an arcuate configuration and are connected together via buffer amplifiers 202, each with adjustable gain control.

While in accordance with the provisions of the Patent Statutes the preferred form and embodiments of the invention have been illustrated and described, and it will be apparent that various changes and modifications may be made in the apparatus set forth above.

What is claimed is:

1. An electromagnetic flowmeter for measuring the flow of fluid in a conduit, comprising:
   (a) a conduit (24) for receiving the fluid flow;
   (b) means arranged externally of the conduit for producing within said conduit a magnetic filed that extends concentrically about the longitudinal axis of the conduit, said magnetic field having a stronger first portion adjacent the inner circumferential surfaces of said conduit, and a weaker second portion adjacent the center of the conduit, said magnetic field producing means including:
      (1) at least a first pair of diametrically arranged winding means (20, 22; 150, 152) mounted externally of said conduit; and
      (2) means for energizing said winding means to produce magnetic fields within said conduit that extend in the same direction concentrically about the longitudinal axis of said conduit;
   (c) first electrode means ($E_1$, $E_2$) supported by said conduit within said stronger first portion of said magnetic field;
   (d) second electrode means ($E_0$, 70) supported by said conduit outside of said stronger first magnetic field portion, said first and second electrode means being arranged to electrically engage the fluid in said conduit; and
   (e) signal detection (42) means connected between said first and second electrode means for generating a signal that is a function of the velocity of the fluid flow.

2. Apparatus as defined in claim 1 wherein said first electrode means includes at least four ($E_1$, $E_2$, $E_3$, $E_4$) electrodes arranged in circumferentially spaced relation adjacent the inner circumferential surface of said conduit, a first pair of said electrodes ($E_1$, $E_2$) being arranged radially intermediate said first pair of winding means and the longitudinal center line of said conduit respectively, the other pair of electrodes being arranged intermediate said first pair of electrodes, respectively.

3. Apparatus as defined in claim 2, and further including a second pair of winding means (80, 82) arranged in circumferentially spaced relation about said conduit intermediate said first pair of winding means, respectively, said first and second pairs of winding means having magnetic axes extending in the same direction concentrically about said conduit, said other two electrodes being arranged radially intermediate said second pair of winding means and the center of said conduit, respectively, and means for alternately energizing said first and second pairs of winding means, respectively.

4. Apparatus as defined in claim 3, and further including four circumferentially spaced transition winding means (84, 86, 88, 90) arranged concentrically about said conduit between said first and second pairs of winding means, respectively, and means (91) for continuously energizing said transition winding means.

5. Apparatus as defined in claim 4, wherein said four electrodes $E_1'$, $E_2'$, $E_3'$, $E_4'$, each have such a dimension in the direction circumferentially of the conduit as to extend at each end beyond its associated winding means.

6. Apparatus as defined in claim 5, wherein alternate pairs of said electrodes ($E_1''$, $E_2''$; $E_3''$, $E_4''$) are longitudinally spaced relative to said conduit, the circumferential dimensions of said electrodes being such that the adjacent ends of successive electrodes overlap.

7. Apparatus as defined in claim 4, wherein each of said winding means includes a plurality of sectors (140) associated with a corresponding electrode (142), respectively.

8. Apparatus as defined in claim 1, wherein said first winding means comprise a pair of diametrically arranged toroidal windings (20, 22) the magnetic axes $\beta$ of which extend in the same direction concentrically about the conduit.

9. Apparatus as defined in claim 8, wherein said toroidal windings each having a rectangular cross-section defining turns having longer opposed sides ($t_1$, $t_2$; $t_3$, $t_4$) that extend longitudinally of the conduit.

10. Apparatus as defined in claim 1, wherein said magnetic field producing means includes at least a first pair of circumferentially spaced squirrel-cage-type windings (150, 152) arranged in diametrically opposed relation externally of said conduit, and means for energizing said squirrel cage windings to produce within said conduit a pair of magnetic fields that extend concentrically in the same direction about the longitudinal axis of said conduit.

11. Apparatus as defined in claim 10, and further including shaping winding means (159) for shaping at least one of said magnetic fields.

12. Apparatus as defined in claim 1, wherein said conduit (160) is normally generally horizontal, and further wherein said first pair of winding means and the associated electrodes are horizontally spaced diametrically of said conduit, thereby to afford measurement of the velocity of fluid flow in partially filled conduits and in open channels.

13. Apparatus as defined in claim 1, wherein said second electrode means comprises at least one electrode (70) mounted centrally within said conduit.

14. Apparatus as defined in claim 1, wherein said first electrode means includes at least one generally arcuate electrode the axis of generation of which is adjacent the longitudinal center of the conduit.

15. Apparatus as defined in claim 14, wherein said arcuate electrode comprises a plurality of electrode sections (200) arranged in an arcuate pattern, and means (204) electrically connecting together said sections.

16. Apparatus as defined in claim 15, wherein said connecting means includes a plurality of buffer amplifiers.

17. Apparatus as defined in claim 16, wherein at least some of said buffer amplifiers include variable gain adjustment means.

* * * * *